(No Model.)

J. N. KELLERMAN.
HORSE COLLAR FASTENER.

No. 409,044. Patented Aug. 13, 1889.

Witnesses:
E. P. Ellis,
J. M. Nesbit

Inventor:
Jos. N. Kellerman,
per J. A. Lehmann,
Atty.

UNITED STATES PATENT OFFICE.

JOSEPH NICHLAS KELLERMAN, OF BLAIR, NEBRASKA.

HORSE-COLLAR FASTENER.

SPECIFICATION forming part of Letters Patent No. 409,044, dated August 13, 1889.

Application filed April 29, 1889. Serial No. 308,944. (No model.)

*To all whom it may concern:*

Be it known that I, JOSEPH NICHLAS KELLERMAN, of Blair, in the county of Washington and State of Nebraska, have invented certain new and useful Improvements in Horse-Collar Fasteners; and I do hereby declare the following to be a full, clear, and exact description of the invention, such as will enable others skilled in the art to which it pertains to make and use it, reference being had to the accompanying drawings, which form a part of this specification.

My invention relates to an improvement in horse-collar fasteners; and it consists in the combination of two castings which are curved so as to correspond to the shape of the lower portion of the collar and which are applied to opposite ends thereof, each casting being provided with a loop and one of the parts provided with a catch which passes through the loop in the other part of the fastener for the purpose of locking the two ends of the collar together, as will be more fully described hereinafter.

The object of my invention is to provide a collar-fastener which will strengthen the ends of the collar and make it strong, durable, and firm, and by means of which the collar can be quickly put on and taken off without straining the collar or fastenings.

Figure 1:
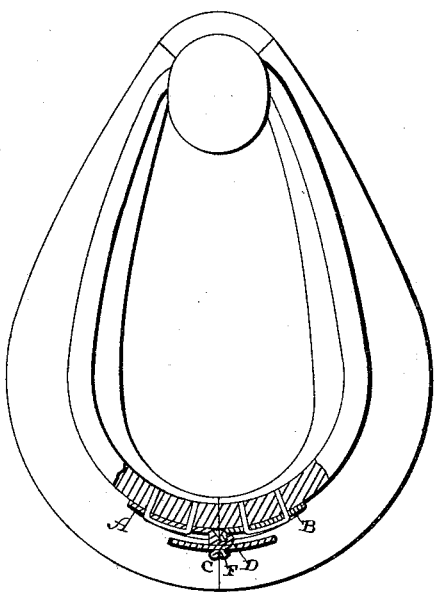
Figure 2:
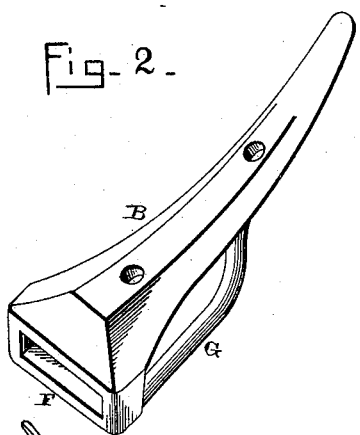
Figure 3:
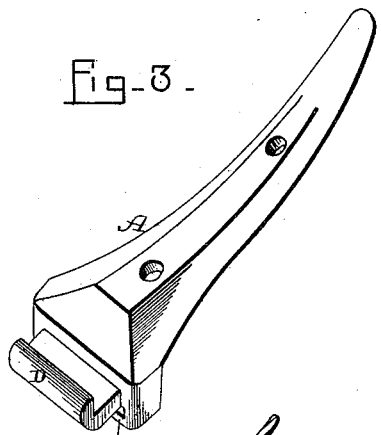
Figure 4:
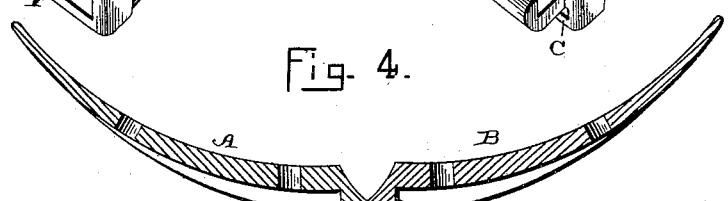

Figure 1 is a vertical section of a collar-fastener which embodies my invention. Figs. 2 and 3 are perspectives of the two parts of the fastener. Fig. 4 is a detached vertical longitudinal sectional view of the fastener.

A represents one part of the fastener, and B the other. These two parts are secured to the lower opposite ends of the collar and are curved so as to correspond to the shape of the collar, as shown. Each part is secured rigidly in place by means of a long staple which is passed through the collar and through the fastenings, the staple being made of galvanized metal and so shaped as not to injure the horse's shoulders or neck by coming in contact with it.

The part A is provided with the loop C, and the hook D on its inner end, and the part B is provided with the loop F, which is larger than the one C, and with the martingale-loop G. The hook D on the part A passes through the loop F, and is prevented from becoming detached by the passage of one end of the hame-strap through the two loops C F, as shown in Fig. 1. Should the hame-strap not be passed through the loops, the hook D would still hold the ends of the collar securely together.

These fastenings applied to opposite ends of the collar, brace and strengthen the collar at this point and make it strong, durable, and firm. The fasteners being secured to the collar by means of the staples it is impossible for the parts of the fastener to become detached, and the whole strain upon this portion of the collar is brought to bear upon the staples instead of upon ordinary rivets, which are liable to tear out.

Having thus described my invention, I claim—

In a collar-fastener, the part A, provided with the hook D upon its inner end, and loop C, located below the hook, with the part B, provided with the loop F, and a shoulder upon the outer side of the loop, and a strap which is passed through the two loops C F, so as to keep the hook in contact with the shoulder, substantially as shown.

In testimony whereof I affix my signature in presence of two witnesses.

JOSEPH NICHLAS KELLERMAN.

Witnesses:
H. H. REED,
FRANK SAUR.